3,338,890
2-AMINOMETHYLENE-ANDROSTANE DERIVATIVES

Howard J. Ringold, Shrewsbury, Mass., and John A. Zderic and Albert Bowers, Mexico City, Mexico, assignors, by mesne assignments to Syntex Corporation, a corporation of Panama
No Drawing. Filed Dec. 15, 1960, Ser. No. 75,928
Claims priority, application Mexico, July 31, 1959, 55,451
18 Claims. (Cl. 260—239.5)

The present application is a continuation-in-part of our copending application Ser. No. 30,063 filed May 19, 1960, now abandoned.

The present invention relates to novel cyclopentanophenanthrene compounds and process of preparing same.

More particularly, the present invention relates to 2-aminomethylene androstanes of the following formulas:

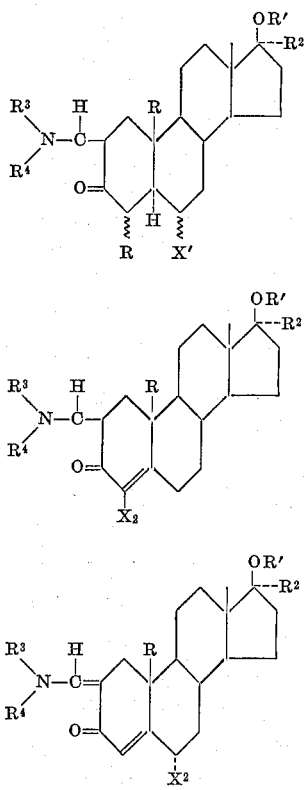

In the above formulas, X' represents hydrogen, methyl or fluorine; $X^2$ represents hydrogen, methyl, fluorine, chlorine or bromine; R represents hydrogen or methyl; R' represents hydrogen or the acyl residue of a hydrocarbon carboxylic acid containing up to 12 carbon atoms, saturated or unsaturated, straight chain or branched chain aliphatic, cyclic, cyclic-aliphatic, aromatic and which may be substituted with hydroxy, acyloxy of up to 12 carbon atoms, alkoxy of up to 6 carbon atoms, amino or halogen; $R^2$ represents hydrogen, alkyl, alkenyl or alkinyl containing up to eight carbon atoms; $R^3$ and $R^4$ represent hydrogen, alkyl, aralkyl, aryl, or dialkylaminoalkyl, containing up to eight carbon atoms or $R^3$ and $R^4$ together with the nitrogen atom form a heterocyclic radical such as piperidino, morpholino, pyrollidino or piperazino which may or may not contain alkyl substituents. There are also contemplated within the scope of the present invention the quaternary ammonium derivatives of the foregoing aminomethylene derivatives formed with alkyl halides or aralkyl halides.

Typical of the ester groups at C–17β are the acetate, propionate, isobutyrate, hemisuccinate, enanthate, benzoate, caproate, phenoxyacetate, aminoacetate, trimethylacetate and β-chloropropionate.

The novel compounds of the present invention are hormones of the androgenic type which exhibit an extremely marked anabolic effect and also exhibit antigonadotrophic and anti-estrogenic activity.

The novel compounds of the present invention are prepared by reacting the respective 2-hydroxymethylene-17β-ol-3-one compound with an excess of a primary amine, a secondary amine, or a diamine in which one of the amino groups may be in the form of a secondary or tertiary amine. The reaction is generally conducted in a solvent inert to the reactants and which may or may not be the amine itself and may vary from heating on the steam bath to reflux temperature, the temperature being dependent upon the amine that is employed. Thus, the steroid may be refluxed with methylaniline in the presence of a solvent such as methanol or benzene, followed by slow distillation for removal of the solvent, excess amine and water of reaction. Similarly, the 2-piperidylmethylene derivative of the respective steroid is obtained by refluxing the steroid with piperidine in benzene, followed by removal of the liquid by distillation. The reaction of the steroid with aniline is effected in acetic acid on the steam bath for one hour; the condensation of the steroid with phenethylamine is preferably conducted in benzene, while with dimethylamine, the condensation is effected in benzene under pressure for one to two hours.

The 2-hydroxymethylene-17β-ol-3-one compound may also, as may be understood, reacted with ammonia to form unsubstituted aminomethylene compounds. In this case the reaction is preferably conducted at room temperature for a prolonged period of time as for example of 1 to 3 days. The reaction was preferably performed in an inert organic solvent such as dioxane.

The quaternary ammonium salts of the 2-aminomethylene steroids having a tertiary amino group are obtained by heating the tertiary aminomethylene steroid with an aliphatic or aromatic halide, preferably an alkyl halide or aralkyl halide containing up to eight carbon atoms, in a solvent such as acetone.

When the 2-aminomethylene steroids having a secondary amino group are reacted with a molar equivalent of an aliphatic or aromatic halide, preferably at room temperature in a solvent such as nitromethane, the amino hydrogen is replaced by the aliphatic or aromatic moiety of the corresponding aliphatic or aromatic halide. However, by utilizing an excess of the halide, there is formed the quaternary ammonium salt of the 2-aminomethylene steroid.

The aminomethylene group at C–2 may be catalytically hydrogenated to the aminomethyl group particularly if the steroid moiety does not contain nuclear double bonds.

The preparation of the novel compounds of the present invention may be illustrated in part by the following equation:

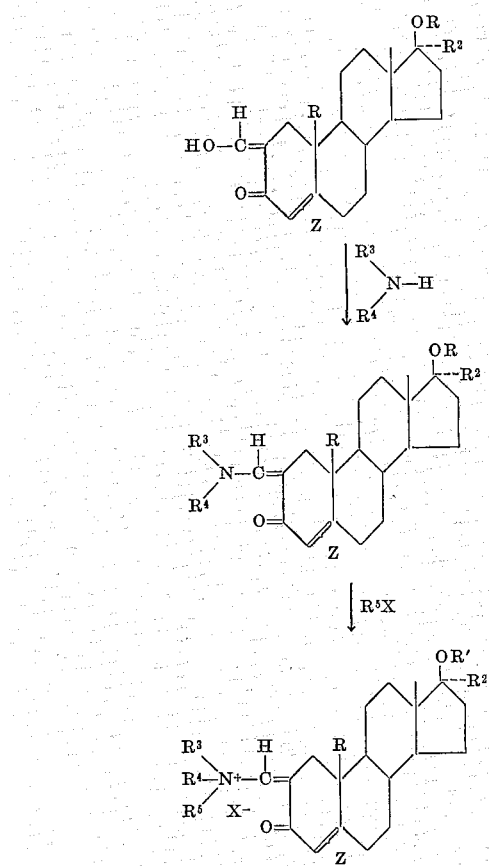

In the above formulas, R, R', R², R³ and R⁴ have the same meaning as previously set forth. R⁵ represents an alkyl or aralkyl group containing up to eight carbon atoms; X represents a halogen such as chlorine, bromine or iodine and Z indicates a saturated linkage between C–4 and C–5 or a double bond between C–4 and C–5.

The preparation of the novel compounds of the present invention wherein the amino group is derived from a diamine may be illustrated by the following equation:

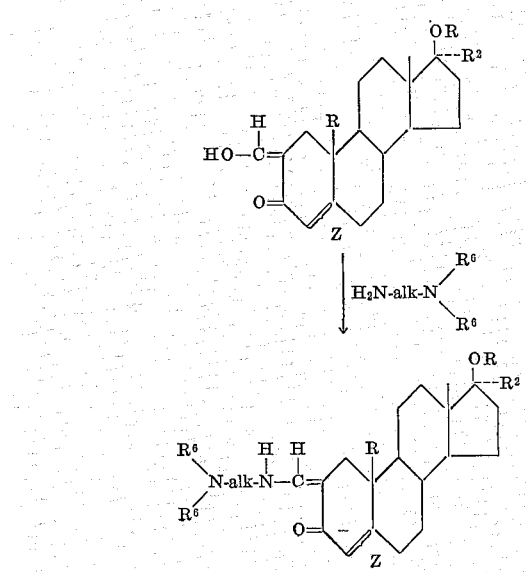

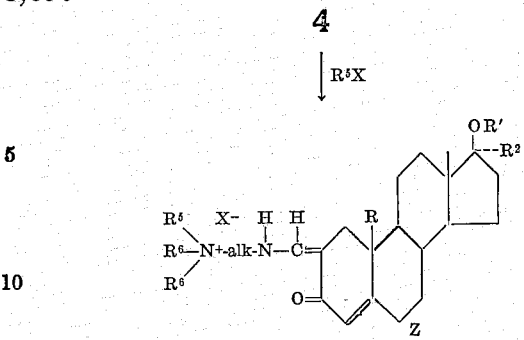

In the above formulas, R, R', R², R⁵, X and Z have the same meaning as set forth above; R⁶ represents hydrogen or a lower alkyl group and alk indicates a lower alkylene radical.

In practicing the process above outlined, a 2-hydroxymethylene steroid of the androstane series of the type disclosed by Ringold et al. in U.S. Patent 2,908,693 and in J. Am. Chem. Soc. 81, 427 (1959), is condensed with an alkylene diamine such as N',N'-diethylethylenediamine or N',N'-dimethylethylenediamine to produce the corresponding N',N'-diethylaminoethylaminomethylene or N',N'-dimethylaminoethylaminomethylene derivative of the steroid, which upon treatment with an alkyl halide in a solvent such as acetone, benzene or nitromethane at room temperature is transformed into the quaternary ammonium salt.

The following examples serve to illustrate but are not intended to limit the scope of the present invention:

Example I

A mixture of 600 mg. of 2-hydroxymethylene-17α-methyl-dihydroallotestosterone, 840 cc. of methanol and 4 cc. of N-methylaniline was subjected to a slow distillation, whereupon the liquid was evaporated to dryness in the course of 2 hours. By chromatography of the residue on neutral alumina, eluting the product with ether and recrystallizing from acetone, there was obatined 2-N-methylanilinomethylene-17α-methyl - androstan-17β-ol-3-one having M.P. 198–199° C.; $\lambda_{max.}$ 238 and 344 mμ, log $\epsilon$ 3.52 and 4.20.

Example II

A mixture of 500 mg. of 2-hydroxymethylene-17α-methyl-dihydroallotestosterone, 10 cc. of benzene and 1 cc. of piperidine was refluxed for 10 minutes, then evaporated to dryness and the residue was purified by crystallization from benzene, thus yielding 2-piperidylmethylene-17α-methyl-androstan-17β-ol-3-one with M.P. 242–244° C.; $[\alpha]_D$ —255° (chloroform);

$$\lambda_{max.}^{EtOH} \; 334 m\mu, \; \log \; \epsilon 4.37$$

Example III

A mixture of 300 mg. of 2-hydroxymethylene-17α-methyl-testosterone, 10 cc. of benzene and 1 cc. of piperidine was refluxed for 30 minutes, concentrated almost to dryness, treated with water and the solid was collected by filtration, washed, dried and purified by chromatography on neutral alumina, thus affording 2-piperidylmethylene-17α-methyl-testosterone.

Example IV

In accordance with the method of Example II, there was refluxed 600 mg. of 2-hydroxymethylene-17α-methyl-19-nor-dihydroallotestosterone with 1.6 cc. of morpholine in mixture with 15 cc. of benzene to give 2-morpholinylmethylene-17α-methyl-19-nor-androstan-17β-ol-3-one.

A solution of 300 mg. of the above compound in 10 cc. of acetone was treated with 10 molar equivalents of methyl iodide and heated in a sealed tube at 90° C. for 1 hour, concentrated almost to dryness, diluted with a little cold ether and the precipitate was collected by filtration, thus giving the methoiodide of 2-morpholinylmethylene-17α-methyl-19-nor-androstan-17β-ol-3-one.

Example V

By essentially following the procedure described in Example I, by reaction of the 17-acetate of 2-hydroxymethylene-17α-ethyl-testosterone with N-methylaniline there was obtained 2-N-methylanilinomethylene-17α-ethyl-17β-acetoxy-Δ⁴-androsten-3-one.

Example VI

By essentially following the procedure described in Example II, 2-hydroxymethylene-17α-methyl-4-chlorotestosterone disclosed in copending application Ser. No. 773,829, filed Nov. 14, 1958, now Patent No. 2,966,501 was reacted with phenethylamine to produce 2-phenethylaminomethylene - 17α-methyl-4-chloro-Δ⁴-androsten-17β-ol-3-one.

Example VII

A mixture of 1 g. of 2-hydroxymethylene-6β-methyl-dihydroallotestosterone, 2 g. of dimethylamine and 20 cc. of benzene was heated in a sealed tube for half an hour at 75° C. The mixture was then washed with water, the benzene was evaporated and the residue was purified by chromatography on neutral alumina, thus furnishing 2-dimethylaminomethylene-6β-methyl - androstan - 17β-ol-3-one.

A mixture of 500 mg. of the above compound, 10 cc. of nitromethane and 2 molar equivalents of benzyl chloride was kept at room temperature for 48 hours and then distilled under reduced pressure until crystallization started. The mixture was diluted with hexane and the precipitate was collected, washed with hexane and purified by chromatography on neutral alumina, thus giving the chlorine of (N-benzyl-N-dimethyl)-aminoethylene-6β-methyl-androstan-17β-ol-3-one.

Example VIII

In accordance with the method described in Example VII, there was condensed the 17-acetate of 2-hydroxymethylene-17α-methyl-dihydroallotestosterone with dimethylamine to give 2-dimethylaminomethylene-17α-methyl-17β-acetoxy-androstan-3-one.

1 g. of the above compound was treated with 2 equivalents of propyl bromide in 20 cc. of nitromethane at room temperature and the product was isolated as in the method described in Example VII. There was thus obtained the bromide of 2-(N-dimethyl-N-propyl)-aminomethylene-17α-methyl-17β-acetoxy-androstan-3-one.

Example IX

By following the method of Example IV, the 2-hydroxymethylene derivative of 17α - ethyl - dihydroallotestosterone was converted successively into 2-morpholinylmethylene-17α-ethyl-androstan-17β-ol-3-one and the corresponding methiodide derivative.

Example X

In accordance with the method of Example II, 500 mg. of 2-hydroxymethylene-17α-ethyl - dihydroallotestosterone was treated with piperidine in benzene solution, to produce 2-piperidylmethylene-17α-ethyl - androstan-17β-ol-3-one.

Example XI

By following the method of Example I, 1 g. of 2-hydroxymethylene testosterone was treated with N-methylaniline thus producing 2 - N - methylanilinomethylene testosterone.

Example XII 2 g. of 17α-ethinyl-dihydroallotestosterone was treated with ethyl formate in the presence of sodium hydride, in accordance with the method described by H. J. Ringold et al. in J. Am. Chem. Soc. 81, 427 (1959), to produce the 2-hydroxymethylene derivative of 17α-ethinylandrostan-17β-ol-3-one. The above compound was condensed with N-methylaniline, in accordance with the method of Example I, to produce 2N-methylanilinomethylene-17α-ethinyl-androstan-17β-ol-3-one.

Example XIII

By following the procedure of Example II, 1 g. of 2-hydroxymethylene-17α-vinyl-testosterone obtained from 17α-vinyl-testosterone by treatment with ethyl formate in the presence of sodium hydride, in accordance with the method described by H. J. Ringold et al. in J. Am. Chem. Soc. 81, 427 (1959), was converted into 2-piperidylmethylene-17α-vinyl-testosterone.

Example XIV

In accordance with the method described in Example I, the 2-hydroxymethylene derivative of 6α-fluoro-dihydroallotestosterone was converted into 2-N-methylanilinomethylene-6α-fluoro-androstan-17β-ol-3-one. 500 mg. of the above compound were treated with acetic anhydride in pyridine solution in a conventional manner, to produce the corresponding acetate.

The starting material, namely 2-hydroxymethylene-6α-fluoro-dihydroallotestosterone was obtained from 6α-fluoro-androstan-17β-ol-3-one disclosed in copending application Ser. No. 804,153 filed Apr. 6, 1959, now abandoned, by condensation with ethyl formate in the presence of sodium hydride by following the procedure described by H. J. Ringold et al. in J. Am. Chem. Soc. 81, 427 (1959).

Example XV

By following the procedure described in Example I, 2-hydroxymethylene-testosterone was reacted with dimethylaminoethylamine to produce 2-[N',N'-dimethylaminoethylaminomethylene] - Δ⁴ - androsten - 17β - ol-3-one. In accordance with the method disclosed in Example VII, the latter compound was treated with one equivalent of methyl iodide in nitromethane at room temperature to finally afford the methoiodide of 2-[N',N'-dimethylaminoethylaminomethylene] - Δ⁴ - androsten - 17β-ol-3-one.

Example XVI

In accordance with the method described in Example I, 2-hydroxymethylene-17α-methyl-androstan-17β-ol-3-one was reacted with N',N'-diethylaminoethylamine to afford 2-[N',N'-diethylaminoethylaminomethylene]-17α-methyl-androstan-17β-ol-3-one. The above compound had a higher oral anabolic activity than methyl testosterone, when measured in the castrate, male rat, whereas the androgenic activity was less than 0.1 that of methyl testosterone in the same assay. Therefore the anabolic-androgenic ratio was greater than 10. Upon further heating at reflux temperature with methyl iodide in acetone for 24 hours, was transformed into the methoiodide of 2 - [N,N' - diethylaminoethylaminomethylene] - 17α-methyl-androstan-17β-ol-3-one.

Example XVII

In accordance with the method described in Example II, 2-hydroxymethylene-4-bromo-17α-methyl-testosterone, disclosed in copending application Ser. No. 773,829, filed on Nov. 14, 1958, was converted into 2-piperidylmethylene-4-bromo-17α-methyl-testosterone.

Example XVIII

In accordance with the method described in Example IV, 2-hydroxymethylene-4-methyl-testosterone, obtained from 4-methyl-testosterone by treatment with ethyl formate in the presence of sodium hydride as described by Ringold et al. in U.S. Patent 2,908,693, was converted into 2-morpholinylmethylene-4-methyl-testosterone and subsequently into the methiodide thereof as described in such Example.

Example XIX

6α-fluoro-17α-methyl-testosterone was converted into the 2-hydroxymethylene derivative in accordance with the method described by Ringold et al. in U.S. Patent 2,908,693. The thus formed 2-hydroxymethylene-6α-fluoro-17α-methyl-testosterone was condensed with N-methyl-aniline in accordance with the method of Example I to produce 2-N-methylanilinomethylene-6α-fluoro-17α-methyl-testosterone.

In accordance with the method described by Ringold et al. in U.S. Patent 2,908,693, the 2-hydroxymethylene derivatives of the compounds listed under A were formed and, in accordance with the method described in Example II, were then transformed into the corresponding 2-piperidylmethylene derivative listed under B.

| Example | A | B |
| --- | --- | --- |
| XX | 4α,17α-dimethyl-dihydroallotestosterone | 2-piperidylmethylene-4α,17α-dimethyl-androstan-17β-ol-3-one. |
| XXI | 6β-fluoro-19-nor-dihydroallotestosterone | 2-piperidylmethylene-6β-fluoro-19-nor-androstan-17β-ol-3-one. |
| XXII | 6 (α or β)-methyl-19-nor-dihydroallo-testosterone. | 2-piperidylmethylene-6 (α or β)-methyl-19-nor-androstan-17β-ol-3-one. |
| XXIII | 4-fluoro-testosterone | 2-piperidylmethylene-4-fluoro-Δ⁴-androsten-17β-ol-3-one. |

In accordance with the method disclosed by Ringold et al. in the aforementioned U.S. patent, there were first formed the 2-hydroxymethylene derivatives of the compounds listed under C, which by the method described in Example I, were converted into the 2-N-methylanilinomethylene derivatives listed under D.

| Example | C | D |
| --- | --- | --- |
| XXIV | 4-chloro-6α-methyl-testosterone | 2-N-methylanilino-methylene-4-chloro-6α-methyl-Δ⁴-androsten-17β-ol-3-one. |
| XXIV | 6α,17α-dimethyl-testosterone | 2-N-methylanilino-methylene-6α,17α-dimethyl-Δ⁴-androsten-17β-ol-3-one. |
| XXV | 6β-fluoro-17α-methyl-dihydroallotestosterone. | 2-N-methylanilino-methylene-6β-fluoro-17α-methyl-androstan-17β-ol-3-one. |
| XXVI | 6α-methyl-17α-ethyl-19-nor-dihydroallo-testosterone. | 2-N-methylanilino-methylene-6α-methyl-17α-ethyl-19-nor-androstan-17β-ol-3-one. |

Example XXVII

By essentially following the procedures of Example IV, the products of Example XX through XXVI were treated with methyl iodide to form the corresponding methoiodide salts of all the products formed in such examples.

Example XXVIII

By substituting benzyl chloride for the methyl iodide in the preceding example, there were formed the corresponding benzyl chloride salts of all the products formed in Examples XX through XXVII.

Example XXIX

A mixture of 200 cc. of dioxane saturated with ammonia and 7 g. of 2-hydroxymethylene-17α-methyldihydroallotestosterone was stirred at room temperature for 72 hours. The formed precipitate was filtered and the crude 2-aminomethylene-17α-methyl-dihydroallotestosterone thus obtained was purified by crystallization from methanol, M.P. 294–295°, [α]$_D$ +35° (pyridine)

$\lambda_{max.}^{EtOH}$ 314–316 mμ, log ε 4.20

This compound had twice the anabolic activity of 17α-methyl-testerone when administered orally to the castrate male rat, while the androgenic activity was 0.2 that of 17α-methyl-testosterone in the same assay.

Example XXX

By following the method of the preceding example, 2-hydroxymethylene-17α-methyl-19-nor-dihydroallotestosterone, 2-hydroxymethylene-17α-methyl-4-chloro-testosterone and the 17-acetate of 2-hydroxymethylene-17α-ethyl-testosterone were converted into the corresponding 2-aminomethylene derivatives.

Example XXXI

A mixture of 1 g. of 2-hydroxymethylene-17α-methyl-dihydroallotestosterone, 2 g. of diethylamine and 20 cc. of benzene was heated in a sealed tube for 30 minutes at 75° C. The mixture was then washed with water, the benzene was evaporated and the residue purified by chromatography on neutral alumina, thus producing 2-diethyl-aminomethylene-17α-methyl-androstan-17β-ol-3-one. This compound had the same oral anabolic activity as 17α-methyl-testosterone in the castrate male rat; the androgenic activity was less than 0.1 that of 17α-methyl-testosterone in the same assay.

We claim:
1. 2-N-methylanilinomethylene - 17α-methyl-androstan-17β-ol-3-one.
2. 2-N-methylanilinomethylene-17α - ethinyl-androstan-17β-ol-3-one.
3. 2-N-methylanilinomethylene - 6α - fluoro-androstan-17β-ol-3-one.
4. 2-[N',N' - diethylaminoethylaminomethylene] - 17α-methyl-androstan-17β-ol-3-one.
5. The chloride of 2-[N-benzyl-N-dimethylaminomethylene]-6β-methyl-androstan-17β-ol-3-one.
6. The bromide of 2-[N-dimethyl-N-propylaminomethylene]-17α-methyl-17β-acetoxy-androstan-3-one.
7. The methoiodide of 2-morpholinylmethylene - 17α-methyl-19-nor-androstan-17β-ol-3-one.
8. 2-piperidylmethylene-17α-methyl-Δ⁴-androsten - 17β-ol-3-one.
9. 2-N-methylanilinomethylene-17α-ethyl-17β - acetoxy-Δ⁴-androsten-3-one.
10. 2 - phenethylaminomethylene-17α-methyl-4-chloro-Δ⁴-androsten-17β-ol-3-one.
11. 2-N-methylanilinomethylene-Δ⁴-androsten - 17β-ol-3-one.
12. 2-piperidylmethylene-17α - vinyl-Δ⁴-androsten-17β-ol-3-one.
13. 2 - morpholinylmethylene-4-methyl-Δ⁴ - androsten-17β-ol-3-one.
14. The methiodide of 2-[N',N'-dimethylaminoethyl-aminomethylene]-Δ⁴-androsten-17β-ol-3-one.
15. 2-N-methylanilinomethylene - 6α-fluoro - 17α-methyl-Δ⁴-androsten-17β-ol-3-one.
16. 2-N-methylanilinomethylene-6α,17α - dimethyl-Δ⁴-androsten-17β-ol-3-one.
17. 2-N-methylanilinomethylene - 4-chloro - 6α-methyl-Δ⁴-androstene-17β-ol-3-one.
18. A compound selected from the group consisting of compounds of the following formula

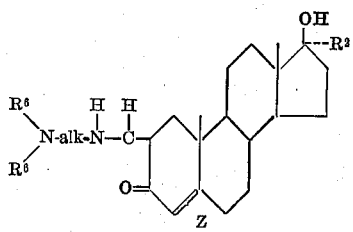

wherein $R^2$ is selected from the group consisting of hydrogen, and lower alkyl containing up to eight carbon atoms; Z is selected from the group consisting of a saturated linkage between C–4 and C–5 and a double bond between C–4 and C–5; $R^6$ is selected from the group consisting of hydrogen and a lower alkyl group and alk indicates a lower alkylene radical.

No references cited.

LEWIS GOTTS, *Primary Examiner.*

L. H. GASTON, ELBERT L. ROBERTS, *Examiners.*

G. E. LANDE, HENRY FRENCH, *Assistant Examiners.*

UNITED STATES PATENT OFFICE
CERTIFICATE OF CORRECTION

Patent No. 3,338,890 August 29, 1967

Howard J. Ringold et al.

It is hereby certified that error appears in the above numbered patent requiring correction and that the said Letters Patent should read as corrected below.

Column 9, lines 1 to 10, the formula should appear as shown below instead of as in the patent:

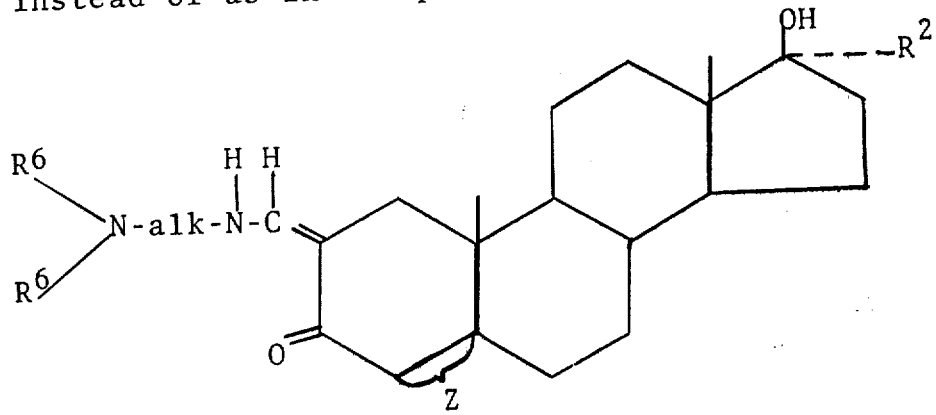

Signed and sealed this 24th day of September 1968.

(SEAL)
Attest:

EDWARD M. FLETCHER, JR.
Attesting Officer

EDWARD J. BRENNER
Commissioner of Patents